United States Patent [19]

Ewin

[11] 4,089,594
[45] May 16, 1978

[54] SUN SCREEN STRUCTURE

[75] Inventor: James Coe Ewin, Holmdel, N.J.

[73] Assignee: Bell Telephone Laboratories, Incorporated, Murray Hill, N.J.

[21] Appl. No.: 805,813

[22] Filed: Jun. 13, 1977

[51] Int. Cl.² .................... G02B 17/00; G02B 27/00; F24J 3/02
[52] U.S. Cl. .................................... 350/262; 126/271
[58] Field of Search .............................. 350/258–265; 126/271

[56] References Cited

U.S. PATENT DOCUMENTS

| 2,812,691 | 11/1957 | Boyd | 350/260 |
|---|---|---|---|
| 3,085,473 | 4/1963 | Bourgeaux et al. | 350/262 X |
| 3,453,039 | 7/1969 | Osborne | 350/260 |

*Primary Examiner*—Richard A. Wintercorn

*Attorney, Agent, or Firm*—Charles H. Davis

[57] ABSTRACT

A sun screen structure is disclosed which consists of a covering for external building surfaces that reflect sunlight during summer months and admit it during winter months to help stabilize internal building temperatures. The covering consists of a planar array of short focal length optical lenses. A pattern of light-reflective and light-transmissive surfaces is located at the focal plane of each lens in the array. The lenses project the rays of the sun onto the reflective or transmissive surfaces, depending on the angle of elevation of the rays with respect to the horizon. The reflective surfaces are located so that the rays are reflected away from the building during the summer months. The transmissive surfaces are located so that the rays are transmitted towards the building interior during the winter months.

9 Claims, 5 Drawing Figures

SUN SCREEN STRUCTURE

FIELD OF THE INVENTION

This invention relates to solar heating devices and more particularly to seasonally responsive sun screens.

BACKGROUND OF THE INVENTION

Solar heating effects often play a large part in the heating and cooling of building structures. Sunlight striking the external surfaces of a building may greatly increase the air conditioning load in the summer months. Conversely, solar heating effects may substantially reduce the heating load in the winter, particularly for small structures.

In order to control the effects of solar heating, many prior art devices have been used to reduce the heating effects of sunlight on internal building temperatures. Most designs involve the control of sunlight entering a building via the windows. For example, some designs involve coating the windows of a building with a light-reflective medium. This has the advantage of reflecting sunlight during the summer months and reducing the air conditioning load. This design is effective in buildings where a large amount of the surface area is transparent to sunlight. However, a problem exists with this design in that sunlight is also reflected during the winter months as well as the summer months. Thus, not only is the heating effect of the sunlight lost, but the interior of the building tends to remain dimly lit, requiring an additional energy expenditure for artificial lighting. Other schemes have been developed to control solar heating involving motorized blinds and shades. The blinds can be adjusted during the winter or summer months to adjust the amount of sunlight entering the building. However, this scheme tends to be complicated and expensive and becomes uneconomical if a large area must be controlled.

No method in the prior art has been developed in order to control solar heating effects over an entire surface of a building, including those portions which are opaque to sunlight.

SUMMARY OF THE INVENTION

The foregoing problems and others are solved by this invention exemplified by one illustrative embodiment of a sun screen structure which consists of an outside building surface covering that admits sunlight to the building during winter months and reflects sunlight during summer months to optimize the effects of solar energy. The covering consists of a plurality of short focal length lenses which may be molded in a suitable transparent material and arranged in a plane. A pattern of light-reflective and light-transmissive surfaces is arranged at the focal plane of each lens in the array. During the summer months, sunlight is focused by each lens onto the reflective surfaces of the pattern, and thus most of the incoming solar energy is reflected towards the exterior of the building. During the winter months, the angle of the incoming sunlight is different so that the sunlight is focused by the lenses onto the transmissive surfaces of the pattern, and thus the solar energy is transmitted to the building to reduce heating requirements of the structure.

DETAILED DESCRIPTION

Figure 1:
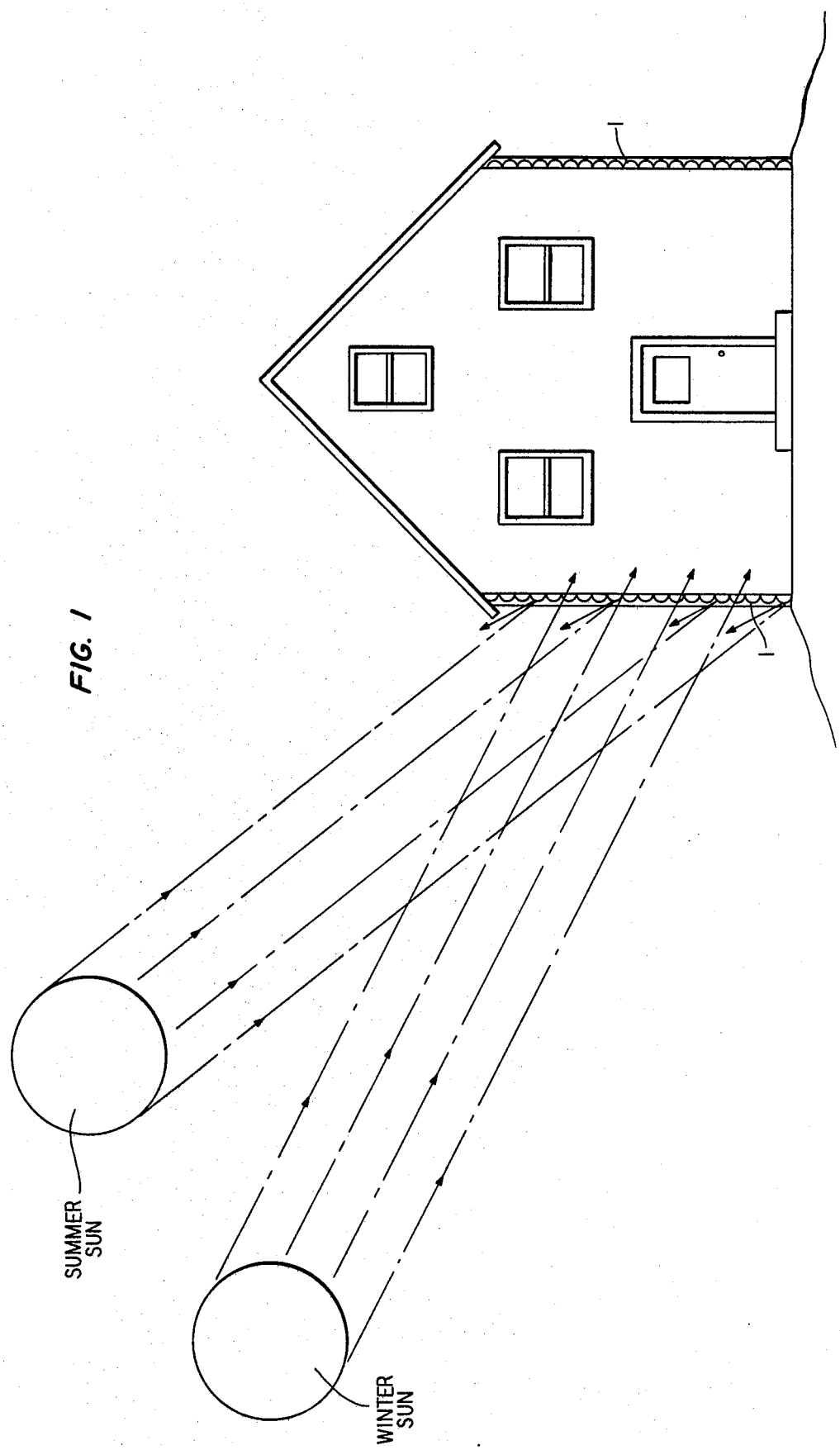
FIG. 1 illustrates a building having exterior sun screen wall panels of the illustrative type described herein placed on the appropriate walls of the building so as to filter selectively the transmission of the sun's rays to the building in accordance with the seasonal variation in the angle of elevation of the rays.

In FIG. 1, illustrative wall panels 1 of this invention are shown placed on two of the walls of a building that are transverse to the direction of the morning and evening rays of the sun. This achieves a highly efficient use of the filtering properties of the invention. Similar panels designed in accordance with the principles disclosed herein could also advantageously be placed on the remaining walls of the building and especially on the roof to maximize the advantages of use of the invention.

As will be described further, the panels comprise a planar array of lenses and reflecting surfaces molded into the panels in such a manner to reflect the rays of a summer sun which impinge on the panels within a prescribed range of angle of elevation, and to transmit the sun's winter rays which impinge on the panels at lower angles of elevation. Accordingly, the auxiliary energy required to heat the building in winter and to cool it in summer is reduced.

Figure 2:
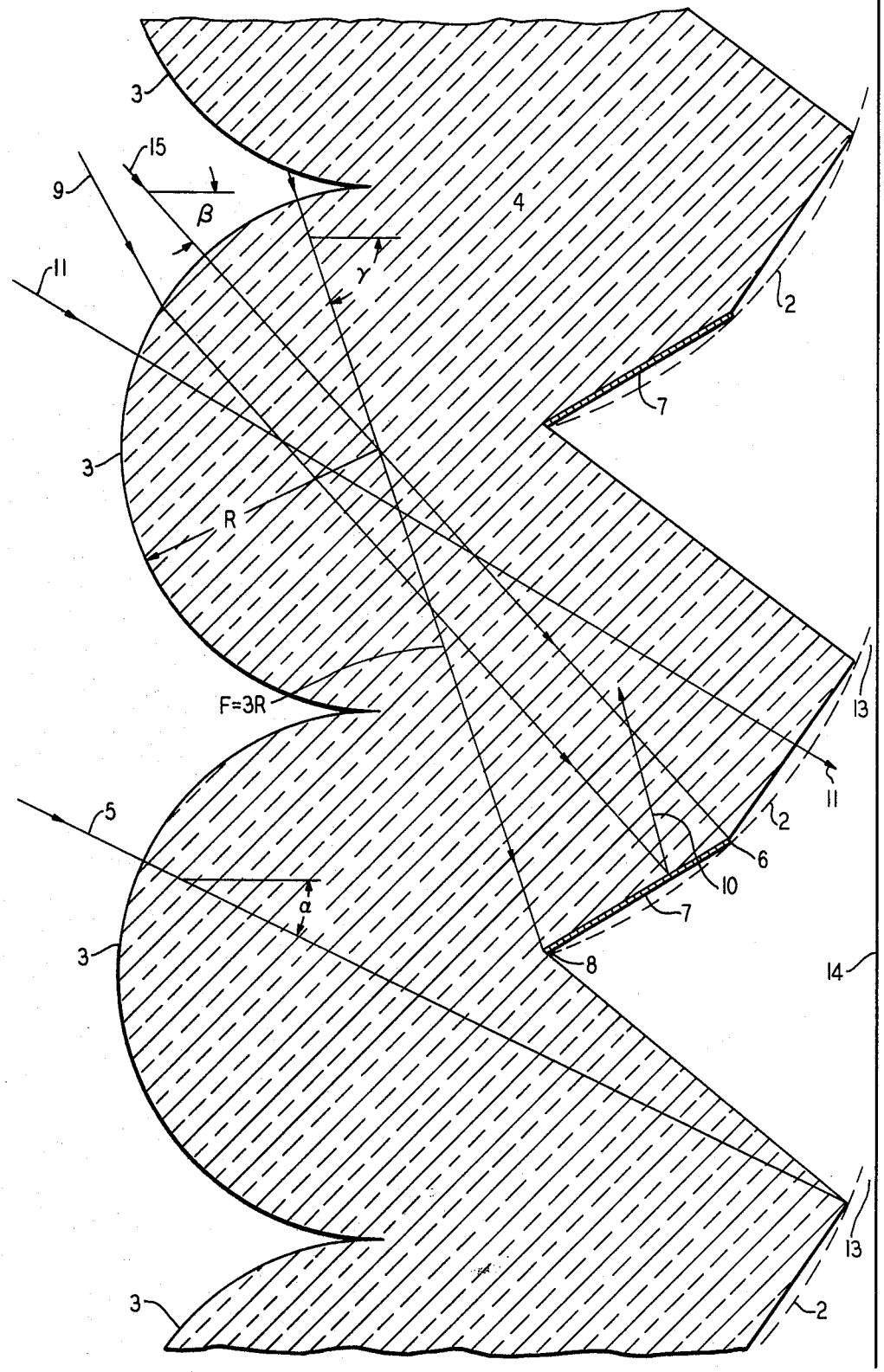
FIG. 2 shows a cross-sectional diagram of the planar lens array of the instant invention.

An illustrative embodiment of a panel of the present invention is shown in cross section in FIG. 2. Lens array 4 is constructed of a transparent or translucent material which may illustratively be plastic or glass, and one face of the lens material has a number of hemispherical single surface lenses 3 molded therein. Lenses 3 may be arranged to cover the plane in a variety of geometrical patterns. For example, a hexagonal close packing array such as used on many photographic light meters may be used. Such an array provides the highest number of lenses per unit of surface area and thus improves the efficiency of the sun screen. Each of lenses 3 has a curved focal plane 2. FIG. 2 is drawn for a lens material having an index of refraction ($n$) equal to about 1.5. Thus focal planes 2 are circles with radii F approximately three times the radius of curvature R of lens 3 and centered at the center of lens curvature ($F=3R$). At the focal plane 2 of lenses 3, a number of reflecting surfaces 7 are located. Reflective surfaces 7 are repeated on focal plane 2 with the same geometric pattern and regularity as lenses 3. Surfaces 7 may conveniently be formed by metal deposition on focal plane surface 2 or by metal sheets. Alternatively, a plurality of three-corner reflectors can be molded into the rear surface of lens array 4 to provide a reflecting medium. As will be hereinafter described, reflective surfaces 7 are positioned so that solar energy is transmitted past focal plane 2 during the winter seasons and is reflected during the summer seasons of the year. It should be noted that surfaces 7 need not lie entirely in focal plane 2. Advantageously, only the point dividing the reflective and transmissive portions of the back of the lens array need be in the focal plane, as will hereinafter be discussed.

Lens array 4 is mounted on an external building wall surface 14. Although FIG. 2 shows an air gap 13 between lens array 4 and wall 14, such an air gap is not necessary, and lens array 4 may be mounted directly against wall 14. If it is desired, however, to so locate wall 14, it may be important that the wall consist of fireproof material to cope with the danger of overheating due to the focusing of the sun's rays at this point. Wall 14 acts as a heat-absorbing medium for solar energy transmitted through lens array 4 and thus should be of an appropriate material which will absorb and retain heat energy. Wall 14 need not be in the focal plane of lenses 3 in order to absorb solar energy passing through array 4.

Figure 3:
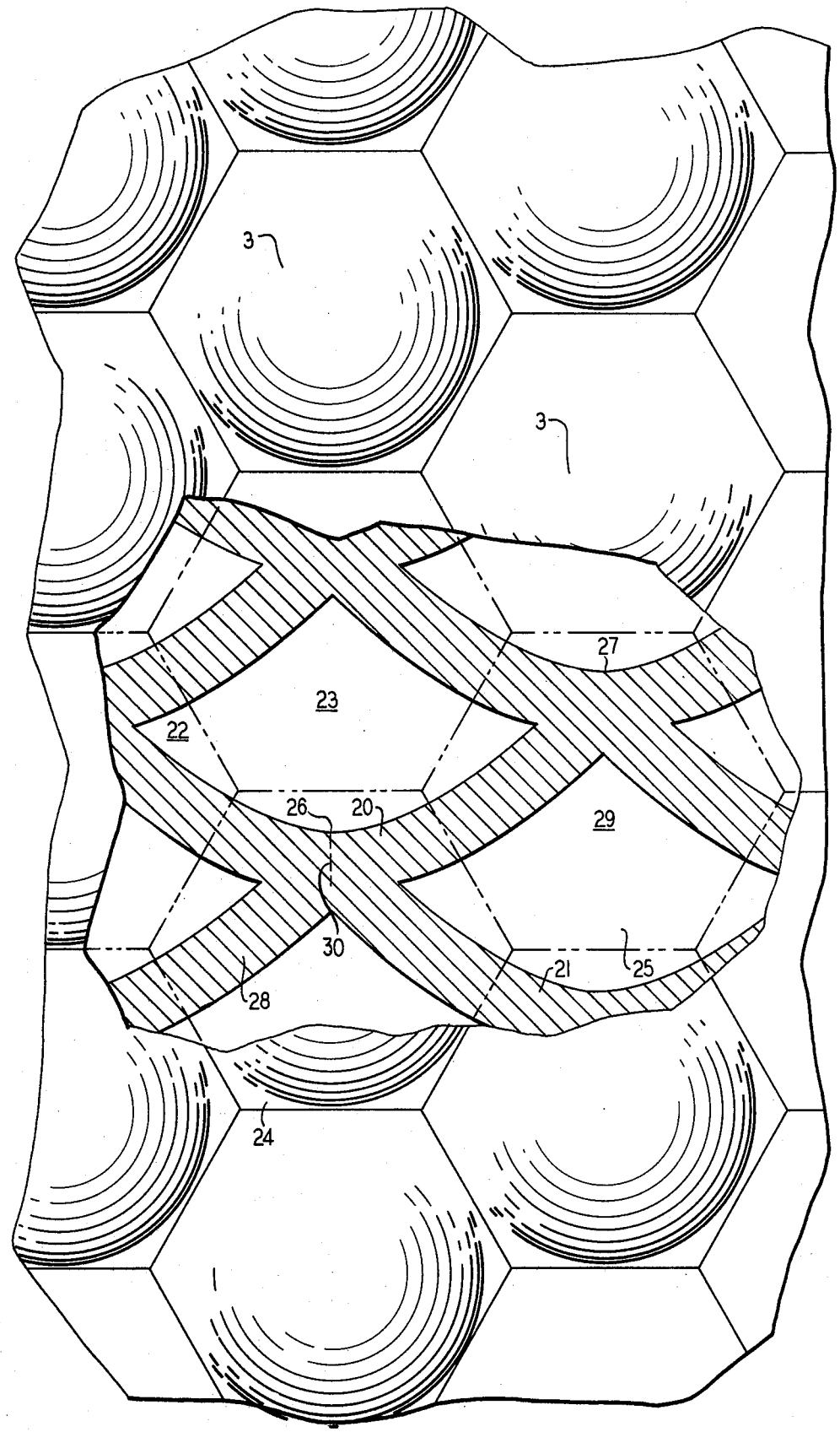
FIG. 3 shows a frontal view of the planar lens array with a portion cut away to reveal the light-transmissive and reflective surfaces.

FIG. 3 shows a front view of lens array 4 showing a plurality of lenses 3 illustratively arranged in a hexagonal close-packing configuration. Portions of several lenses have been cut away to show one pattern of reflecting surfaces located in the focal plane at the back of the lenses. For example, reflecting surface 21 is arranged to reflect summer sunlight focused thereon by lens 29. Similarly, surface 20 is associated with lens 23. The dotted line 30 vertically traversing surface 20 at its midpoint illustratively corresponds to one of the cross-sectional views of the reflective surfaces 7 shown in FIG. 2. For convenience, the hexagonal pattern has been centered so that light from the noonday sun at the vernal equinox, after passing through the lens, strikes the upper edge of the reflecting surfaces in the center of the lens as shown, for example, at points 26 and 27. Surface 21, for example, consists of a strip of reflecting material arranged to reflect sun rays as the sun's meridional angle changes from easterly in the morning to westerly in the afternoon. In addition, the strip is curved to compensate for the change in the sun's angle of elevation at sunrise and sunset. The upward curvature of the strip results from the inverting properties of the lenses and compensates for a decreased angle of elevation of the sun. As will hereinafter be explained in more detail, sunlight from the winter sun enters the lens array at a lower angle of elevation, causing the light to strike the focal plane above surface 21, for example, in the vicinity of area 25. This light is transmitted through lens array 4.

Also, as shown in FIG. 3, surface 21 interacts with surface 20 associated with lens 23 and surface 28 associated with adjacent lens 22. Thus, certain areas which should be transparent from the perspective of surface 21 are actually reflective because of overlapped reflective surfaces 20 and 28. This overlap causes interference between images from adjacent lenses. Discrimination between winter and summer sunlight is thus somewhat impaired. The amount of overlap and the resulting interference is primarily dependent on the index of refraction of the material used to construct lenses 3 and can be reduced by using a material with a high index of refraction. The pattern of the reflective surface may also be modified to favor reflection or transmission as required.

In operation, referring to FIG. 2, lenses 3 focus sunlight onto focal plane 2. Reflective surfaces 7 are arranged to selectively reflect the sunlight, depending on its angle relative to the horizontal. For example, during the summer months, light from the sun at midday impinges on lens array 4 as illustrated by ray 9 in FIG. 2. Ray 9 is transmitted through the lens material, strikes a reflective surface 7, and is reflected as ray 10 towards the exterior of lens array 4. Solar energy is therefore reflected during the summer months. However, during the winter, the angle of the sun relative to the horizontal is lower so that sunlight entering from the noonday sun impinges on the lens array similar to ray 11. Due to the lower angle of the incoming sunlight, ray 11 travels through focal plane 2 and impinges on wall 14. Thus, sunlight impinging on lens array 4 during the winter months is transmitted and absorbed by building wall surface 14.

The angles of the light rays traveling through lens array 4 are dependent not only on the time of year but also on the latitude at which lens array 4 is located. Accordingly, the location of reflective surfaces 7 is also dependent on the latitude. In order to provide effective selectivity, the upper point 6 of a reflective surface 7 should be located at the position at which light from the noonday sun at the vernal equinox strikes focal plane 2. This light, as shown by ray 15, enters lens array 4 at an angle $\beta$ which is equal to 90 - L degrees, where L is the latitude at which the lens array is located. In addition, this point 6 must lie in focal plane 2 so that sun rays at this point will be focused in order to achieve maximum selectivity. Similarly, the lower end 8 of reflective surface 7 should be located at the point where light from the noonday sun at the summer solstice strikes focal plane 2. At this time, sunlight enters the lens array at an angle $\gamma$ which is equal to $113\frac{1}{2}$ - L degrees. During the winter solstice, light enters the system at an angle $\alpha$ which is equal to $66\frac{1}{2}$ - L degrees and corresponds to ray 5 which is transmitted through lens array 4.

Figure 4:
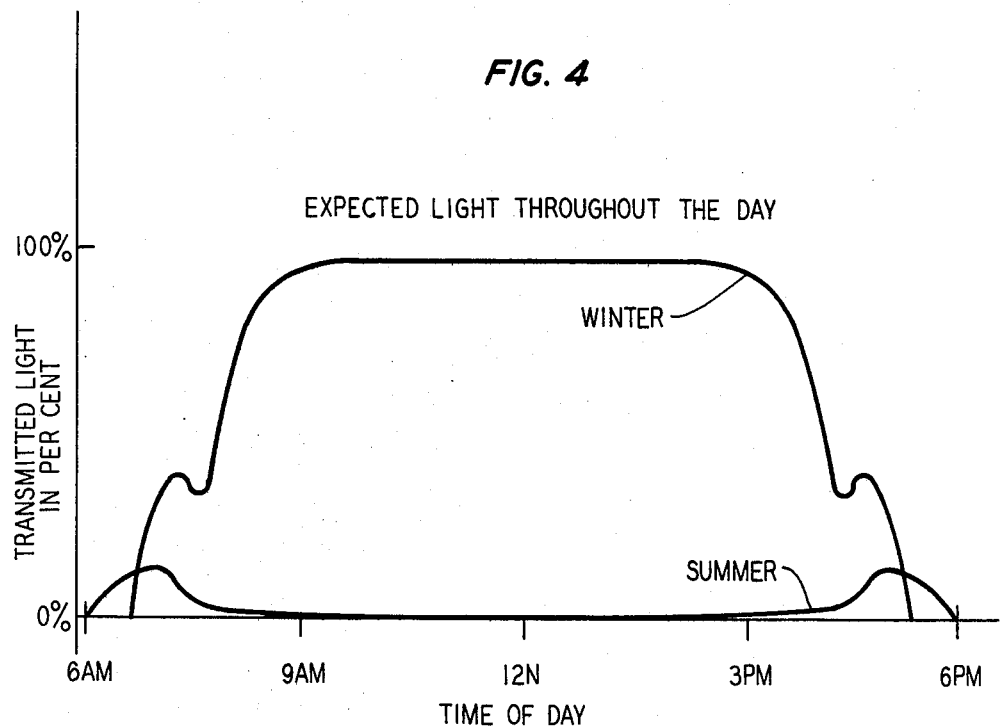
FIG. 4 is a graph of the transmitted light versus the time of day of the present invention.

With proper location of reflective surfaces 7, a transmission function similar to that shown in FIG. 4 can be achieved (cloudless conditions are assumed). During the winter, most of the light energy impinging on the lens array can be transmitted through to the building surfaces during the hours of 9:00 a.m. and 3:00 p.m. Factors which affect the transmission function include spherical aberration of lenses 3, reflecting pattern interference (as described above) and reduced angle to the sun. In the summer, however, nearly all of the light energy is reflected, except for a small portion during the beginning and end of the day when the sun is at a low angle of elevation.

Figure 5:
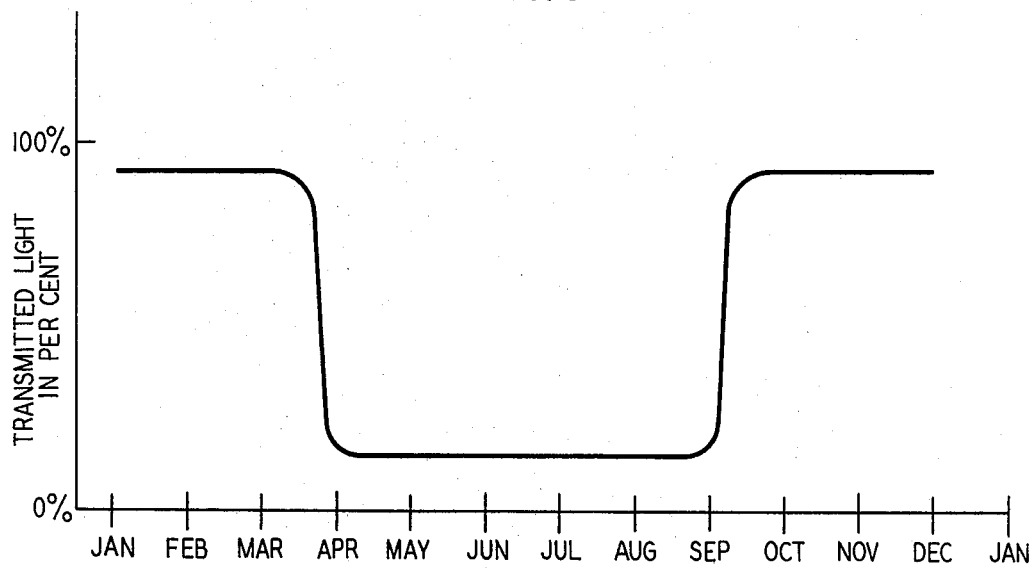
FIG. 5 is a graph of the transmitted light versus the months of the year.

In addition, proper construction of the sun screen should allow a fairly sharp selectivity of transmitted light relative to the time of year as shown in FIG. 5. With proper location of reflective surfaces 7, the selectivity may be reduced so that high light transmission changes to low transmission in a matter of a few days.

It is to be understood that the hereinbefore described arrangement is illustrative of the application of principles of the invention. In light of the teaching, it is apparent that other arrangements may be devised by those skilled in the art without departing from the spirit and scope of the invention.

What is claimed is:

1. A sun screen structure for controlling solar heating of a building, said structure comprising:
    an array of optical lenses located adjacent to the exterior of one or more surfaces of said building, each of said lenses focusing sunlight onto its respective focal plane; and
    means located in the focal plane of each of said lenses for reflecting towards the exterior of said building sunlight of a first prescribed range of angle of elevation with respect to the horizontal and for transmitting towards the interior of said building sunlight of a second prescribed range of angle of elevation with respect to the horizontal.

2. A sun screen structure according to claim 1 wherein said lens array comprises a planar pattern of hemispherical lenses arranged in a periodic geometric pattern.

3. A sun screen structure according to claim 2 wherein said reflecting and transmitting means comprise a periodic pattern of reflective surfaces having the same period as said pattern of lenses.

4. A sun screen structure for controlling solar heating of a building, said structure comprising:
- a planar array of single-surface optical lenses arranged in a periodic hexagonal close-packing pattern located adjacent to the exterior of one or more surfaces of said building, each of said lenses having the same fixed focal length and focusing sunlight onto a curve focal surface; and
- a plurality of mirror surfaces located about said curved surface, said mirror surfaces being arranged in a periodic pattern, having a period equal to the period of said lens array, said mirror surfaces being positioned to reflect sunlight during predetermined portions of the year.

5. A sun screen structure according to claim 4 where each of said mirror surfaces is comprised of a strip of reflective material having at least one edge lying in the curved focal surface of an associated lens.

6. A sun screen structure according to claim 5 wherein the upper edge of said strip of reflective material intersects said curved focal surface at a point where a straight line having an angle of 90° - L below the horizontal and passing through the center of curvature of said associated lens strikes said curved focal surface and wherein the lower edge of said strip of reflecting material intersects said curved focal surface at a point where a straight line having an angle of $113\frac{1}{2}°$ - L below the horizontal and passing through the center of curvature of said associated lens strikes said curved focal surface, where L is the latitude at which said lens array is located.

7. A sun screen structure according to claim 4 further comprising a plurality of light transmissive surfaces located in adjacent positions to said mirror surfaces and being positioned to transmit sunlight during predetermined portions of the year.

8. A sun screen structure according to claim 7 wherein said light transmissive surfaces have at least one edge lying in the curved focal surface of an associated lens.

9. A sun screen structure according to claim 8 wherein the upper edge of one of the light transmissive surfaces intersects said curved focal surface at a point where a straight line having an angle of $66\frac{1}{2}°$ - L below the horizontal and passing through the center of curvature of said associated lens strikes said curved focal surface, and wherein the lower edge of said light transmissive surface intersects said curved focal surface at a point where a straight line having an angle of 90° - L below the horizontal and passing through the center of curvature of said associated lens strikes said curved focal surface, where L is the latitude at which said lens array is located.

* * * * *